US008868236B2

(12) United States Patent
Brogårdh

(10) Patent No.: US 8,868,236 B2
(45) Date of Patent: Oct. 21, 2014

(54) METHOD AND APPARATUS FOR CALIBRATION OF A ROBOT POSITIONED ON A MOVABLE PLATFORM

(71) Applicant: ABB Research Ltd, Zurich (CH)

(72) Inventor: Torgny Brogårdh, Västerås (SE)

(73) Assignee: ABB Research Ltd., Zürich (CH)

( * ) Notice: Subject to any disclaimer, the term of this patent is extended or adjusted under 35 U.S.C. 154(b) by 0 days.

(21) Appl. No.: 13/736,407

(22) Filed: Jan. 8, 2013

(65) Prior Publication Data

US 2013/0123983 A1 May 16, 2013

Related U.S. Application Data

(63) Continuation of application No. PCT/EP2011/061259, filed on Jul. 5, 2011.

(30) Foreign Application Priority Data

Jul. 8, 2010 (SE) .................................. 1050763-0

(51) Int. Cl.
G01C 9/00 (2006.01)
G01C 17/00 (2006.01)
G01C 19/00 (2013.01)
G05B 19/18 (2006.01)
G05B 19/04 (2006.01)
B25J 9/16 (2006.01)

(52) U.S. Cl.
CPC ..... B25J 9/1692 (2013.01); G05B 2219/39013 (2013.01); B25J 9/162 (2013.01); G05B 2219/39014 (2013.01); G05B 2219/40298 (2013.01); G05B 2219/39031 (2013.01); Y10S 901/01 (2013.01); G05B 2219/37205 (2013.01); Y10S 901/15 (2013.01)
USPC ................ 700/254; 73/1.01; 702/85; 702/94; 702/150; 901/1; 901/15

(58) Field of Classification Search
USPC ........ 700/245–264, 118; 73/1.01; 901/44–46, 901/49–50; 382/153; 702/85, 94–954
See application file for complete search history.

(56) References Cited

U.S. PATENT DOCUMENTS 6,088,628 A * 7/2000 Watanabe et al. ............. 700/264
6,812,665 B2 * 11/2004 Gan et al. ................. 318/568.11

(Continued)

FOREIGN PATENT DOCUMENTS

| EP | 1 172 183 A2 | 1/2002 |
| EP | 1 864 764 A2 | 12/2007 |
| WO | WO 2009/149740 A1 | 12/2009 |

OTHER PUBLICATIONS

Jose Mauricio S.T. Motta, Robot Calibration: Modeling Measurement and Applications, Industrial Robotics: Programming, Simulation and Application, Dec. 2006, Edited by Low Kin Huat.*

(Continued)

Primary Examiner — Khoi Tran
Assistant Examiner — Abby Lin
(74) Attorney, Agent, or Firm — Buchanan Ingersoll & Rooney PC

(57) ABSTRACT

A method and apparatus for calibration of a robot on a platform and a robot, in relation to an object using a measuring unit mounted on the robot including placing CAD models so that the robot reaches the object, manipulating the CAD models to move the measuring unit to a pose in relation to the platform allowing measurement of a feature on the object, storing the pose, and generating a CAD model of the feature. The real robot is moved to the pose, the real platform is moved where measurements of the feature can be made, 3D measurements of the feature are performed and based thereon generating a second CAD model, performing a best fit between the CAD models, and calculating a 6 degrees of freedom pose difference between the CAD models, and instructing the mobile platform to move to compensate for the pose difference.

1 Claim, 11 Drawing Sheets

(56) References Cited

U.S. PATENT DOCUMENTS

| | | | |
|---|---|---|---|
| 2004/0251866 A1* | 12/2004 | Gan et al. | 318/568.11 |
| 2006/0088203 A1* | 4/2006 | Boca et al. | 382/153 |
| 2006/0181236 A1* | 8/2006 | Brogardh | 318/568.1 |
| 2007/0282485 A1 | 12/2007 | Nagatsuka et al. | |
| 2008/0154428 A1* | 6/2008 | Nagatsuka et al. | 700/258 |
| 2009/0265030 A1 | 10/2009 | Huang et al. | |
| 2010/0262288 A1 | 10/2010 | Svensson et al. | |

OTHER PUBLICATIONS

International Preliminary Report on Patentability (Form PCT/IB/373) and the Written Opinion of the International Searching Authority (Form PCT/ISA/237) dated Jan. 8, 2013, issued in corresponding International Application No. PCT/EP2011/061259. (8 pages).

International Search Report (PCT/ISA/210) issued on Oct. 2, 2012, by the European Patent Office as the International Searching Authority for International Application No. PCT/EP2011/061259.

Written Opinion (PCT/ISA/237) issued on Oct. 2, 2012, by the European Patent Office as the International Searching Authority for International Application No. PCT/EP2011/061259.

M.C. Wanner et al., "Off-line programming for the aircraft cleaning robot skywash", Intelligent Robots and Systems, Advanced Robotic Systems and The Real World, Proceeding of the IEEE/RSJ/GI International Conference, Sep. 12, 1994, vol. 3, pp. 1972-1979, XP-010142038.

* cited by examiner

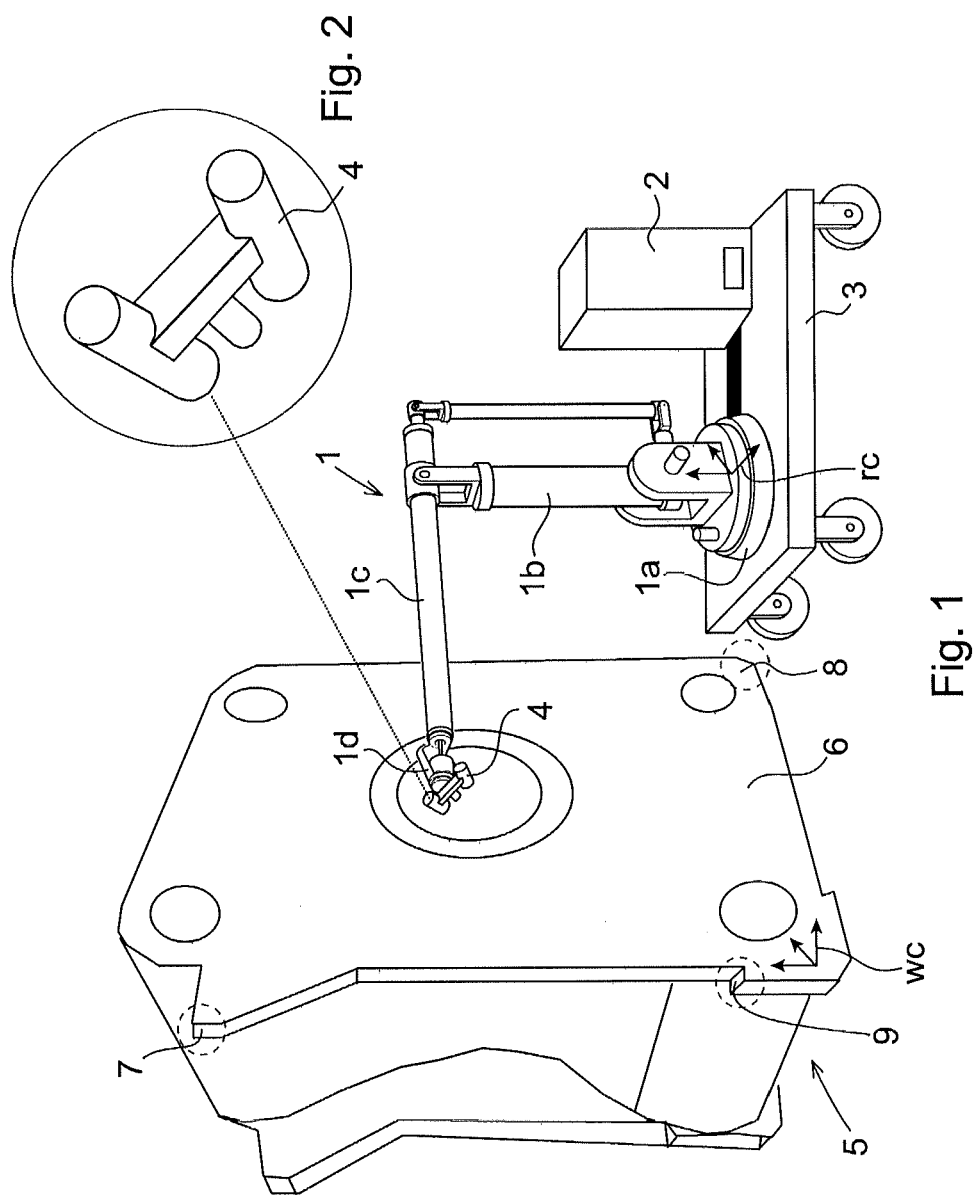

Fig. 6
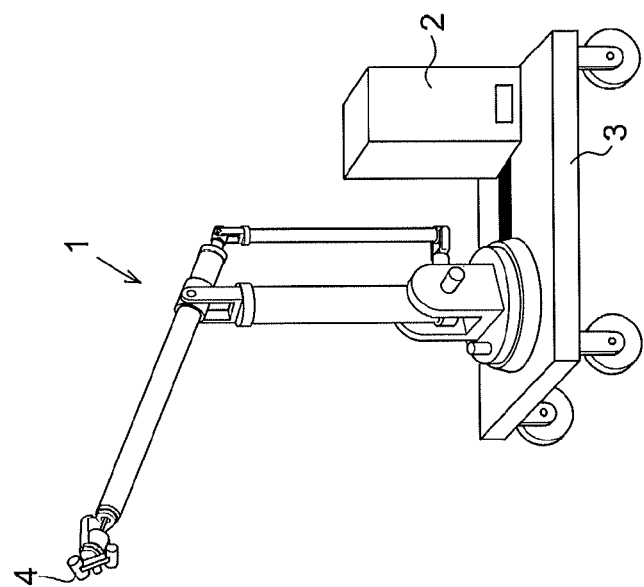
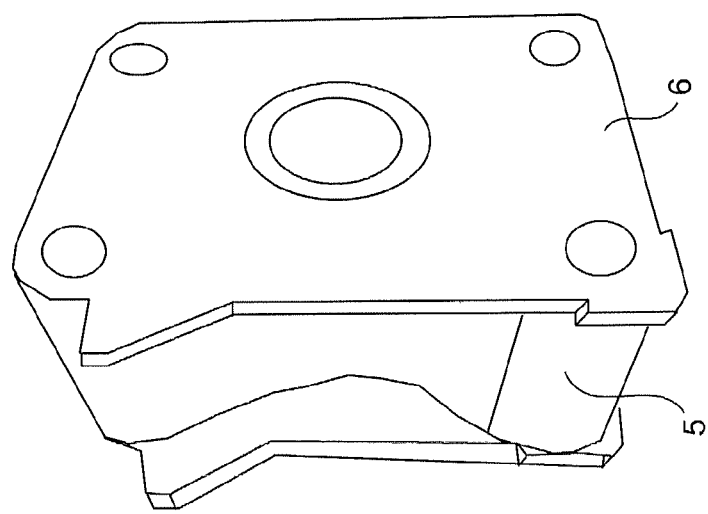

Fig.7
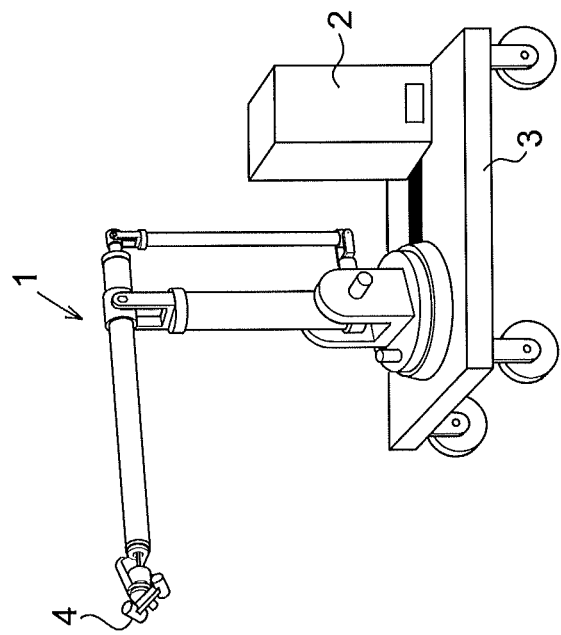
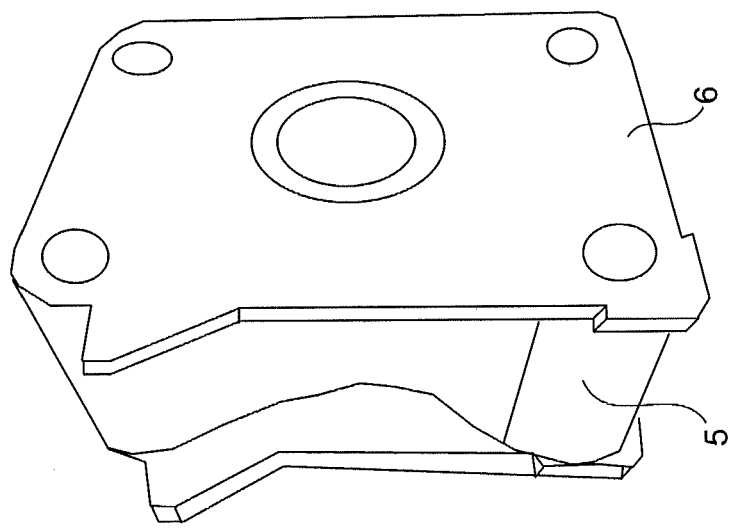

Fig. 8
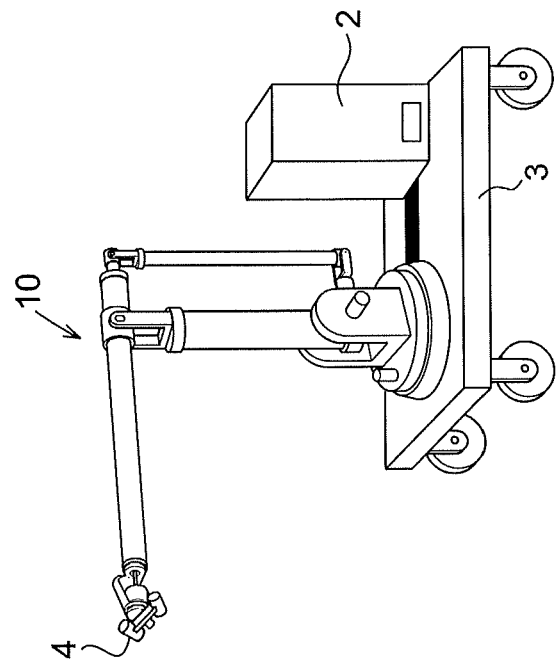
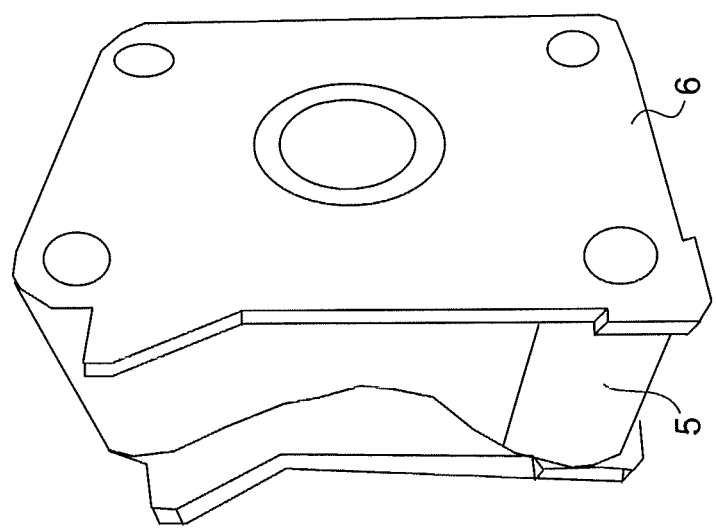

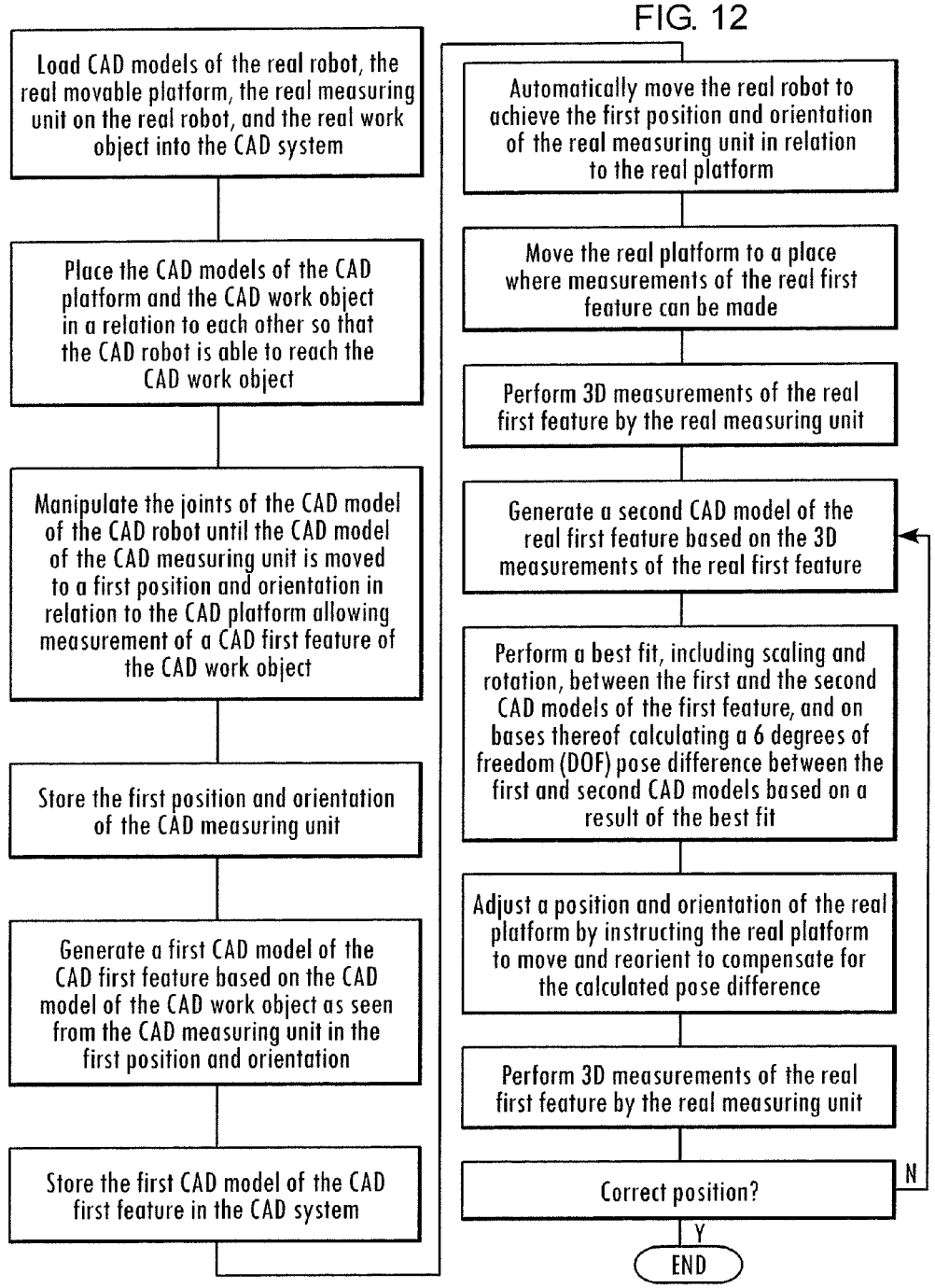

METHOD AND APPARATUS FOR CALIBRATION OF A ROBOT POSITIONED ON A MOVABLE PLATFORM

RELATED APPLICATION(S)

This application claims priority as a continuation application under 35 U.S.C. §120 to PCT/EP2011/061259, which was filed as an International Application on Jul. 5, 2011 designating the U.S., and which claims priority to Swedish Patent Application No. 1050763-0 filed in Sweden on Jul. 8, 2010. The entire contents of these applications are hereby incorporated by reference in their entireties.

FIELD

The present disclosure relates to a method for calibration of a robot, including a plurality of joints and positioned on a movable platform, in relation to a work object using a measuring unit mounted on a wrist of the robot. A movable platform can refer to, for example, a platform which is mobile of its own or is movable by other means, for example, a truck.

BACKGROUND INFORMATION

Although mobile robot research has been conducted for more than 20 years, there is still little impact on the manufacturing industry. Examples of successful products are, for example, lawn mowers, vacuum cleaners, museum guides and toys. However, the technology used for these products can be difficult to use with the requirements of industry. However, there are applications where the manufacturing industry could benefit from mobile robots in order to increase the flexibility of the robot automation. One example is when manufacturing is made of large structures as components to, for example, airplanes, trains, boats, machines, oil platforms, bridges, buildings, power plants, wind mills etc. In the cases when automation technology is used for large structures, expensive large manipulators may be needed. Beside the high cost of these manipulators there is also an issue of moving the large objects to the fixed manipulators. Having mobile robots in these applications, the work objects could remain where they are manufactured and the mobile robots could instead move to the work objects.

A mobile robot can include a base portion and a plurality of parts movable relative to the base portion, and the base portion can be mounted on a movable platform. A base coordinate system can be defined in a fixed relation to the base portion of the robot. A work object coordinate system can be defined in a fixed relation to a work object located in the work area of the robot. The work object coordinate system can be calibrated in relation to the base coordinate system of the robot. When a calibration program for the robot on the movable platform is to be made, there are several issues that should be addressed. At first the placement of the mobile platform during the processing can be determined, and then the work object coordinate system should be accurately measured to be used in the process programs executed by the robot.

A technical issue using industrial robots on mobile platforms is that the calibration of a mobile robot relative a work object to obtain the accuracy needed for most industrial processes, can be difficult and time consuming.

SUMMARY

A method is disclosed for calibration of a real robot modeled by CAD, the robot including a plurality of joints and positioned on a movable real platform, in relation to a work object, using a measuring unit mounted on a wrist of the robot, the method including first steps performed by a processor coupled to a memory including a software CAD system, which first steps comprise: loading CAD models of the robot, the movable platform, the measuring unit on the robot, and the work object into the CAD system; placing the CAD models of the platform and the work object in a relation to each other so that the robot is able to reach the work object; manipulating the joints of the CAD model of the robot until the CAD model of the measuring unit is moved to a first position and orientation in relation to the platform allowing measurement of a first feature of the work object; storing the first position and orientation of the measuring unit; generating a first CAD model of the first feature based on the CAD model of the work object as seen from the measuring unit in the first position and orientation and; storing the first CAD model of the first feature in the CAD system; and the processor performing second steps on the real robot: automatically moving the real robot to achieve the first position and orientation of the measuring unit in relation to the real platform; moving the real platform to a place where measurements of the first feature can be made; performing 3D measurements of the first feature by the measuring unit; generating a second CAD model of the first feature based on the 3D measurements of the first feature; performing a best fit, including scaling and rotation, between the first and the second CAD models of the first feature, and on bases thereof calculating a 6 degrees of freedom (DOF) pose difference between the front and second CAD models; and instructing the real platform to move and reorient to compensate for the calculated pose difference.

An apparatus is disclosed for calibration of a robot including a plurality of joints and positioned on a movable platform, in relation to a work object, using a measuring unit mounted on a wrist of the robot, the apparatus including a processor coupled to a memory including a software CAD system and programmed to configure the processor to perform first steps which comprise: loading CAD models of the robot, the movable platform, the measuring unit on the robot, and a work object to be processed into the CAD system; placing the CAD models of the platform and a work object once loaded in a relation to each other so that the robot will be able to reach the work object; manipulating the joints of the CAD model of the robot until the CAD model of the measuring unit is moved to a first position and orientation in relation to the platform allowing measurement of a first feature of the work object; storing the first position and orientation of the measuring unit; generating a first CAD model of the first feature based on the CAD model of the work object as seen from the measuring unit in the first position and orientation and; storing the first CAD model of the first feature in the CAD system; and the processor is programmed so that it will be configured to perform the following second steps on the real robot: automatically moving the real robot to achieve the first position and orientation of the measuring unit in relation to the platform; moving the real platform to a place where measurements of the first feature can be made; performing 3D measurements of the first feature by the measuring unit; generating a second CAD model of the first feature based on the 3D measurements of the first feature; performing a best fit, including scaling and rotation, between the first and the second CAD models of the first feature, and on bases thereof calculating a 6 degree of freedom (DOF) pose difference between the CAD models; and instructing the real platform to move and reorient to compensate for the calculated pose difference.

A robot is disclosed, in combination with an apparatus for calibration of the robot, the robot including a plurality of joints and positioned on a movable platform, in relation to a work object using a measuring unit mounted on a wrist of the robot, the apparatus including a processor coupled to a memory including a software CAD system and being programmed to configure the processor to perform first steps which comprise: loading CAD models of the robot, the movable platform, the measuring unit on the robot, and the work object into the CAD system; placing the CAD models of the platform and the work object in a relation to each other so that the robot will be able to reach the work object; manipulating the joints of the CAD model of the robot until the CAD model of the measuring unit is moved to a first position and orientation in relation to the platform allowing measurement of a first feature of the work object; storing the first position and orientation of the measuring unit; generating a first CAD model of the first feature based on the CAD model of the work object as seen from the measuring unit in the first position and orientation and; storing the first CAD model of the first feature in the CAD system; and the processor is programmed so that it will perform second steps on the real robot which comprises: automatically moving the real robot to achieve the first position and orientation of the measuring unit in relation to the platform; moving the real platform to a place where measurements of the first feature can be made; performing 3D measurements of the first feature by the measuring unit; generating a second CAD model of the first feature based on the 3D measurements of the first feature; performing a best fit, including scaling and rotation, between the first and the second CAD models of the first feature, and on bases thereof calculating a 6 degree of freedom (DOF) pose difference between the CAD models; and instructing the real mobile platform to move and reorient to compensate for the calculated pose difference.

BRIEF DESCRIPTION OF THE DRAWINGS

The disclosure will now be explained in more detail by the description of different embodiments of the disclosure and with reference to the appended figures.

FIG. 1 shows a robot cell including a work object, a robot on a movable platform, and a measurement unit mounted on the robot according to an exemplary embodiment of the disclosure;

FIG. 2 shows a measurement unit according to an exemplary embodiment of the disclosure;

FIGS. 6-8 illustrate the steps of positioning the platform in relation to the work object during the calibration according to an exemplary embodiment of the disclosure;

FIG. 12 shows a flow chart of a method according to an exemplary embodiment of the disclosure.

DETAILED DESCRIPTION

Figure 3:
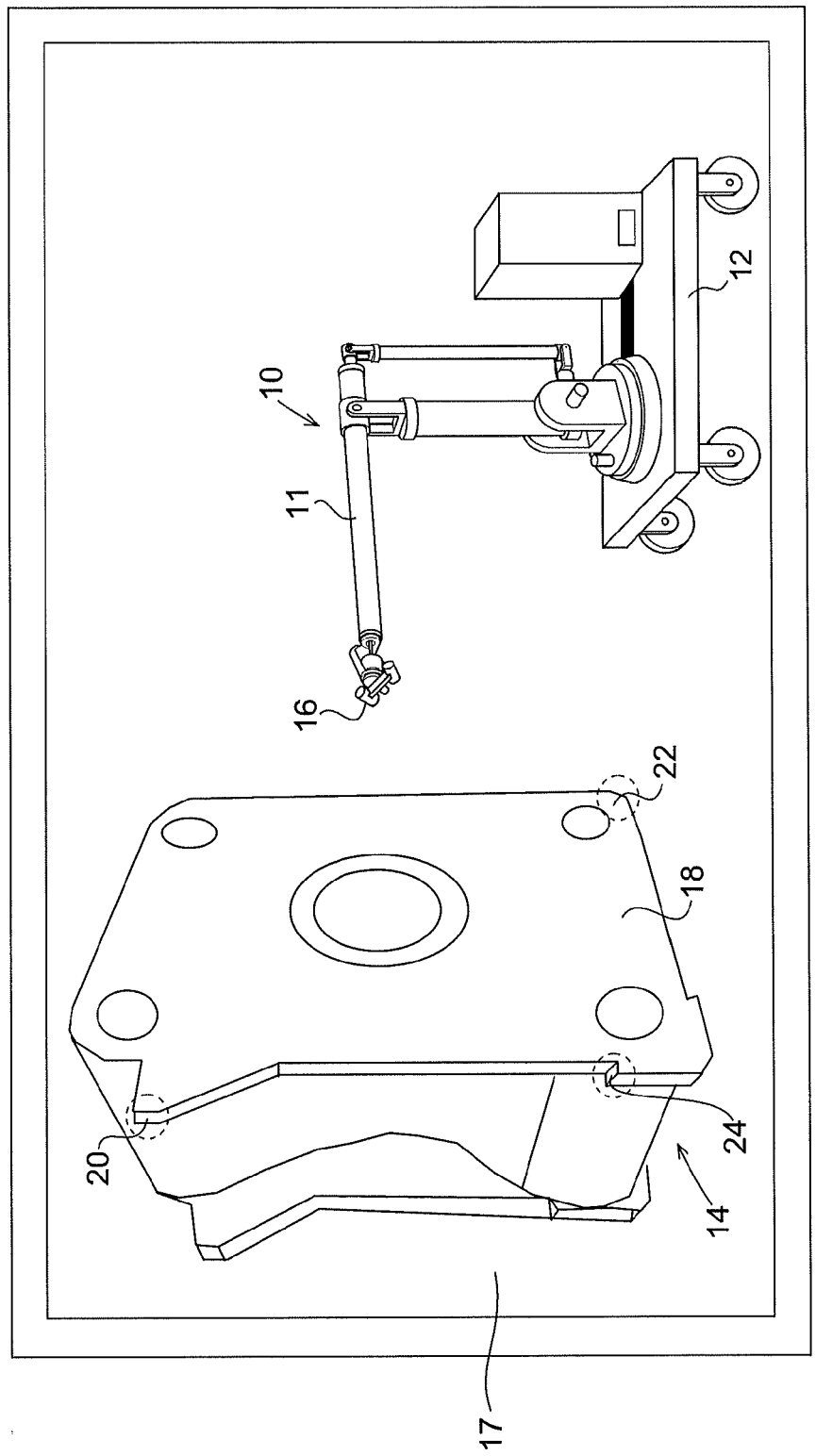
FIG. 3 illustrates a CAD system according to an exemplary embodiment of the disclosure, including CAD models of the work object, the robot, the movable platform, and the measurement unit as shown in FIG. 1.

Exemplary embodiments of the disclosure provide a simple and fast method for calibration of a robot positioned on a movable platform in relation to a large work object.

In a method according to an exemplary embodiment of the disclosure, a processor coupled to a memory includes a software CAD system loading CAD models of the robot, the movable platform, the measuring unit on the robot, and the work object into the CAD system, the method includes placing the CAD models of the platform and the work object in a relation to each other so that the robot is able to reach the work object, manipulating the joints of the CAD model of the robot until the CAD model of the measuring unit is moved to a first position and orientation in relation to the platform allowing measurement of a first feature of the work object, storing the first position and orientation of the measuring unit, generating a first CAD model of the first feature based on the CAD model of the work object as seen from the measuring unit in the first position and orientation, and storing the first CAD model of the first feature in the CAD system.

The method according to an exemplary embodiment of the disclosure includes moving the actual, or real, platform to a place where measurements of the first feature can be made, automatically moving the actual robot to achieve the first position and orientation of the measuring unit in relation to the platform, performing 3D measurements of the first feature by the measuring unit, generating a second CAD model of the first feature based on the 3D measurements of the first feature, performing a best fit, including scaling and rotation, between the first and the second CAD models of the first feature, and on bases thereof calculating the 6 DOF (degrees of freedom) pose difference between the CAD models, and instructing the mobile platform to move and reorient to compensate for the calculated pose difference.

Exemplary embodiments of the present disclosure calibrate a robot in relation to a large work object, both in the case of robot programming made by teach in and in the case of CAD-based robot programming. One result of the analysis is that offline programming can have an important role for mobile robots because this can make the calibration and programming more or less automatic. The concept described is based on the use of a 3D measurement unit.

The term pose can refer to position and orientation.

A CAD model can refer to a 3D model generated by software in a CAD system.

3D measurements can refer to a 3D measurement unit, such as a stereo camera system or a laser scanner, to measure the topology of an object.

With 6 DOF, pose difference between the CAD models can refer to the difference in position and orientation in six degrees of freedom between the two CAD models.

The calibration can be prepared in a CAD system, for example, a CAD based off line robot programming tool. Thereafter, the calibration can be automatically performed in the real world. This method provides an easy and fast calibration of the platform in relation to the work object, i.e. the placement of the mobile platform during the processing is determined. The accuracy achieved with this method can be enough for applications having low demands on the accuracy of the position of the robot relative the work object, such as painting and material handling.

If CAD models of the robot, the movable platform, the measuring unit, and the work object already exist in the robot programming tool, it is suitable to make the preparation of the calibration in the robot programming tool. It is assumed that a 3D measurement unit is mounted on the robot wrist.

In order to obtain an automatic mobile platform placement it is proposed that a CAD model of a part of the work object is used as a reference when the robot is a safe distance from the work object. The first feature is a part of the work object which is possible to measure with the measuring unit when the robot is a safe distance from the work object, for example, a distance large enough to avoid collisions between the robot and the work object during the calibration.

By scaling and rotation, a prepared CAD model of a first feature on the work object can be adjusted to fit a CAD model obtained from measurements of the first feature or vice versa, and the pose difference can be used to determine the position and orientation of the mobile platform. The reference pose is where maximum reachability is obtained for the robot according to earlier offline analysis.

According to an exemplary embodiment of the disclosure, the steps carried out in the CAD system can further include manipulating the joints of the CAD model of the robot until the CAD model of the measuring unit is moved to a second position and orientation in relation to the platform allowing measurement of a second feature of the work object, wherein the second position is closer to the work object than the first position, storing the second position and orientation of the measuring unit, generating a first CAD model of the second feature based on the CAD model of the work object as seen from the measuring unit in the second position and orientation, and storing the first CAD model of the second feature in the CAD system. The steps carried out in the real world can include automatically moving the real robot to achieve the second position and orientation of the measuring unit in relation to the platform, performing 3D measurements of the second feature by the measuring unit, generating a second CAD model of the second feature based on the 3D measurements of the second feature, performing a best fit, including scaling and rotation, between the first and the second CAD models of the second feature, and on the basis thereof calculating the 6 DOF pose difference between the CAD models, and adjusting the coordinate system of the work object relative the coordinate system of the robot based on the difference between the first and the second CAD models of the second feature.

The adjustment of the work object coordinate system relative to the coordinate system of the robot can be carried out in the control system of the robot.

The work object coordinate system should be accurately measured to be used in the process programs executed by the robot. This exemplary embodiment of the disclosure can increase the accuracy of the calibration by providing an accurate determination of the work object coordinate system with respect to the robot coordinate system. Further, this embodiment of the disclosure can provide an easy and fast calibration of the work object relative the robot. This embodiment of the disclosure can be suitable for applications which require high accuracy, such as arc welding, laser cutting, water jet cutting, and assembly.

For the accurate determination of the work object coordinate system, one or more local 3D features are measured with high accuracy and a best fit is made to prepared CAD models of the features. The differences between the positions and orientations of the measured and prepared CAD models are used to compensate for the work object coordinate system deviation when the robot processing program is executed.

The first and second features are well defined 3D features on the work object, such as a side of the work object, a corner, a hole or a protruding part. The second feature is smaller than the first feature and can be a part of the first feature. However, the second feature can also be a part of the work object which is separate from the first feature. The second feature is measured with the robot manipulated to obtain a shorter distance between the measurement unit and the work object compared to when measuring the first feature, and accordingly the second feature can be measured with a higher accuracy than the first feature. Thus, it is not necessary to move the platform between the two measurements.

According to an exemplary embodiment of the disclosure, the method can further include manipulating the joints of the CAD model of the robot until the CAD model of the measuring unit is moved to a third position and orientation in relation to the platform allowing measurement of a third feature of the work object, wherein the third position and orientation is closer to the work object than the first position and orientation, storing the third position and orientation of the measuring unit, generating a first CAD model of the third feature based on the CAD model of the work object as seen from the measuring unit in the second position and orientation, and storing the first CAD model of the third feature in the CAD system, and the second steps carried out in the real world further include automatically moving the real robot to achieve the third position and orientation of the measuring unit in relation to the platform, performing 3D measurements of the third feature by the measuring unit, generating a second CAD model of the third feature based on the 3D measurements of the second feature, performing a best fit, including scaling and rotation, between the first and the second CAD models of the second and third features, and on the basis thereof calculating the 6 DOF pose difference between the CAD models, and adjusting the coordinate system of the work object relative to the coordinate system of the robot based on the 6 DOF pose difference between the first and the second CAD models of the second and third features.

In this embodiment, at least two small features are used for the calibration of the work object coordinate system, which can increase the accuracy of the calibration. In the same way, using three small features can further increase the accuracy of the calibration.

FIG. 1 shows an exemplary embodiment according to the disclosure of a real robot cell including an industrial robot 1 positioned on a movable platform 3 and a large work object 5 partly located in the work area of the robot. The movable platform 3 can be provided with wheels. However, if the platform has no wheel, the platform can be moved between different robot cells, for example, by a truck. In this embodiment, the robot is a six axis robot and accordingly is movable in 6 DOF and has six joints. However, the robot can have less than 6 joints. The movements of the robot can be controlled by a robot control system 2, which is also positioned on the movable platform 3. The movements of the platform can be instructed from the robot control system 2 or from a computer connected to the control system. It is also possible for the operator to move the platform manually.

The robot control system 2, or a computer connected to the robot control system, includes software for generating CAD models based on 3D measurements. In the example shown in FIG. 1, the robot 1 has three main axes, and three wrist axes. The robot includes a stationary base portion 1a, which supports a stand that is rotatable about a first axis. The stand supports a first arm 1b that is rotatable about a second axis.

The first arm supports a second arm 1c, which is rotatable about a third axis. The second arm supports a wrist 1d that is rotatable about a fourth, a fifth and a sixth axis. A robot coordinate system rc can be defined in a fixed relation to the base portion 1a. A work object coordinate system we can be defined in a fixed relation to the work object 5 located in the work area of the robot. The work object coordinate system is to be calibrated in relation to the robot coordinate system.

A measuring unit 4 is mounted on the wrist 1d of the robot. FIG. 2 shows the measuring unit 4 in more detail. The measuring unit 4 can be a 3D measuring unit capable of measuring the topology of an object or part of an object. The measuring unit can be, for example, a line scanner, a surface scanner, a stereoscopic camera system or an interferometer arrangement. In order to use such a measuring unit, the robot system should be equipped with a tool exchanger and the measuring unit should be protected from dust and liquids when not in use. In cases when the measuring unit does not interfere with the processing tool, it could remain on the robot wrist during processing if a tight locking mechanism is used.

In the following it will be described how the position and orientation of the platform 3 with respect to the work object 5 are determined, also called the placement measurement. In doing so it is desirable to define a first 3D feature of the work object. In the following this feature is called a large feature. The large feature can be the whole work object, or a part of the work object, which is possible to measure with the measuring unit when the robot is at a safe distance from the work object, for example, a distance large enough to avoid collisions between the robot and the work object when placement of the platform is made. In the example shown in FIG. 1, a part of or the whole front side 6 of the work object is defined as the large feature.

Further, in order to obtain an accurate 6 DOF calibration of the work object coordinate system relative to the robot coordinate system, at least one second 3D feature should be defined on the work object. Thus, the next task is to select suitable features for the high accuracy calibration of the work object. The second features will be smaller than the first feature because the measuring unit is now closer to the work object than when the first feature was measured for the placement calibration. The second feature can be a part of the first feature. However, the second feature can also be a part of the work object separated from the large feature. In the following the second features are called small features. At least one small feature should be measured, but up to three features may be desirable, dependent on the accuracy requirements and the geometry and size of the features. The features should be selected such that the geometry is as equal as possible between different work object individuals. In objects where this is difficult to obtain, it is possible to make markers on the object, for example, by casting a pattern in the case the object is made from for example plastic or iron. The small features are well defined 3D features on the work object, such as a corner, a hole, or a protruding part. In the example shown in FIG. 1, three corners 7, 8, and 9 are defined as small features.

FIG. 3 illustrates a CAD system including a CAD model 14 of the work object 5, a CAD model 10 of the robot 1, a CAD model 12 of the movable platform 3, and a CAD model 16 of the measurement unit 4 as shown in FIG. 1. The large feature 6 is provided with number 18 in the CAD system, and the small features 7, 8, 9 are provided with the numbers 20, 22, 24 in the CAD system. The CAD system can include a computer, a screen 17 and software for handling CAD models and presenting a view of the CAD models on the screen 17. The CAD system should also include a model of the functionality of the measuring unit, which generates a CAD model of the measured feature in the perspective as seen from the 3D measurement unit, and can also include an error model indicating 6 DOF accuracy levels of the measurements. The CAD system can also include an offline programming tool for programming the movements of the robot. If the programming of the robot was made in the offline programming tool, there already exist CAD models of the work object, the robot and the platform. In that case, only the CAD model of the measuring unit has to be added to the system. The calibration can be prepared in the CAD based offline robot programming tool.

In the following it will be explained, as an example, how the work object 5 and the robot 1 shown in FIG. 1 can be calibrated using the method according to an exemplary embodiment of the disclosure. The first steps of the disclosure are carried out in the CAD system. The first steps include offline preparation of the calibration of the robot and the mobile platform with respect to the work object. At first, CAD models 10, 12, 14, 16 of the robot, the movable platform, the measuring unit, and the work object are loaded into the CAD system. Views of the work object model 14, the platform model 12, the robot model 10 and the measuring unit model 16 are displayed on the screen 17 of the CAD system. In the next step, the CAD models of the platform 12 and the work object 14 are placed in relation to each other on the screen so that the robot is able to reach the part of the work object 14, which is to be processed by the robot. In this way it is then easy to place the real mobile or portable platform in an optimal position and orientation so that the robot can reach the whole area of the work object. The theoretical placement obtained by the CAD models can be such that errors in the real platform placement can be accepted and still the intended part of the work object can be reached.

When placement of the platform model has been determined, the CAD model of the measurement unit 16 is moved to a position and orientation suitable for measurement of the large feature 18 on the work object 14, in the following named the first position and orientation. The placement of the real platform as defined by, for example, the rc coordinate system, can be determined based on measurements of the large feature 18. In the example shown in FIG. 3, the large feature can be defined as the front side 18 of the work object. The CAD model 16 of the measuring unit is moved by manipulating the joints of the CAD model of the robot until the CAD model of the measuring unit has been moved to a suitable first position and orientation in relation to the platform allowing measurement of the large feature on the work object, as illustrated in FIG. 3. A calibration program is generated based on the movements of the joints of the robot model, including instructions for moving the robot so that the measuring unit is moved to the first position and orientation in relation to the platform. The distance between the measuring unit and the work object should be large enough to avoid collisions when the operator makes the first rough placement of the mobile platform. However, if the distance is too large there is a risk that the measurement accuracy of the large feature is not good enough and therefore the placement accuracy is not good enough for reaching the small features, which will be measured for the purpose of calculating the work object coordinate system as accurate as is desired from the process specifications, for example, 0.5 mm for arc welding and even better for laser welding or laser cutting.

Optionally, when moving the robot arm to a position in front of the work object, the measurement area is indicated on the CAD model of the work object. The virtually measured CAD model of this area as calculated by the model of the measurement unit is displayed together with the 6 DOF accuracy figures.

When the large feature has been virtually measured, the position and orientation, in the following named first position and orientation, of the measuring unit are stored in the CAD system. A CAD model, in the following named first CAD model, of the large feature is generated based on the CAD model of the work object as seen from the measuring unit in the determined position and orientation, and the first CAD model of the large feature is stored in the CAD system. If a line scanner is used, scan programming is made, either by moving the robot joints using, for example, a 6 DOF mouse connected to the CAD system or by an automatic function in the CAD system software that automatically generates a scan movement of the robot based on the obtained measurement area. The CAD model of the large feature and the calibration program for moving the measurement unit to the first position and orientation are stored for automatic mobile platform placement.

The calibration program contains the following movement orders to the robot itself to bring the measurement unit to the position and orientation as determined in the CAD system for the measurement of the large feature. An order to the 3D measurement system to perform measurements can be, if a line scanner is used, order the scanning movements to the robot itself. Routines to make best fit between CAD models can be a routine to calculate 6 DOF difference in position and orientation between two 3D models and a routine to calculate the 3 DOF movements of the platform needed to compensate for the mentioned 6 DOF difference. Also, movement orders to the mobile platform to perform the 3 DOF movements can be used.

The calibration program could be run iteratively to refine the placement of the platform.

In cases where low accuracy processes will be used, as for example in some painting cases, the placement measurement may be good enough for the process programming. When the calibration is then made at site with the real robot, the operator first runs the first part of the calibration program that moves the measurement unit to the first position and orientation prepared in the CAD system for the measurement of the large feature. Then the operator moves the platform until the measurement unit has a suitable position and orientation relative to the large feature. The operator then starts the part of the calibration program that makes the platform placement and if the platform has wheels and can be controlled from the robot controller, it will automatically be controlled to obtain the position relative the work object, as determined in the CAD system.

In cases where high accuracy processes will be used, such as welding, cutting, deburring and assembly, the platform placement calibration is not accurate enough for the process programming and the following steps are carried out in order to adjust the coordinate system of the work object with respect to the coordinate system of the robot.

Figure 4:
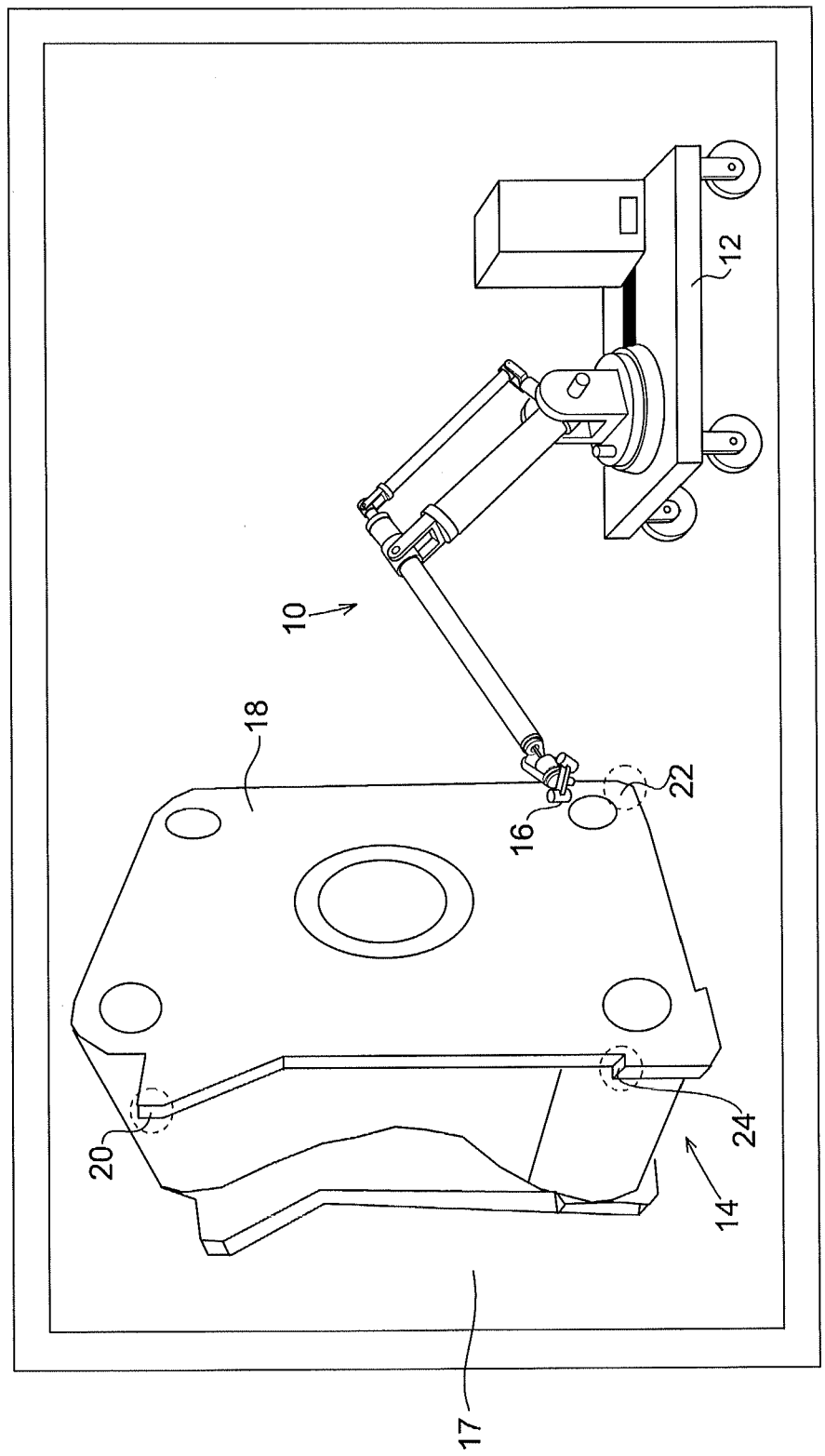
FIG. 4 illustrates the position and the orientation of the measurement unit model 16 when it measures one of the small features of the work object in the CAD system according to an exemplary embodiment of the disclosure.
Figure 5:
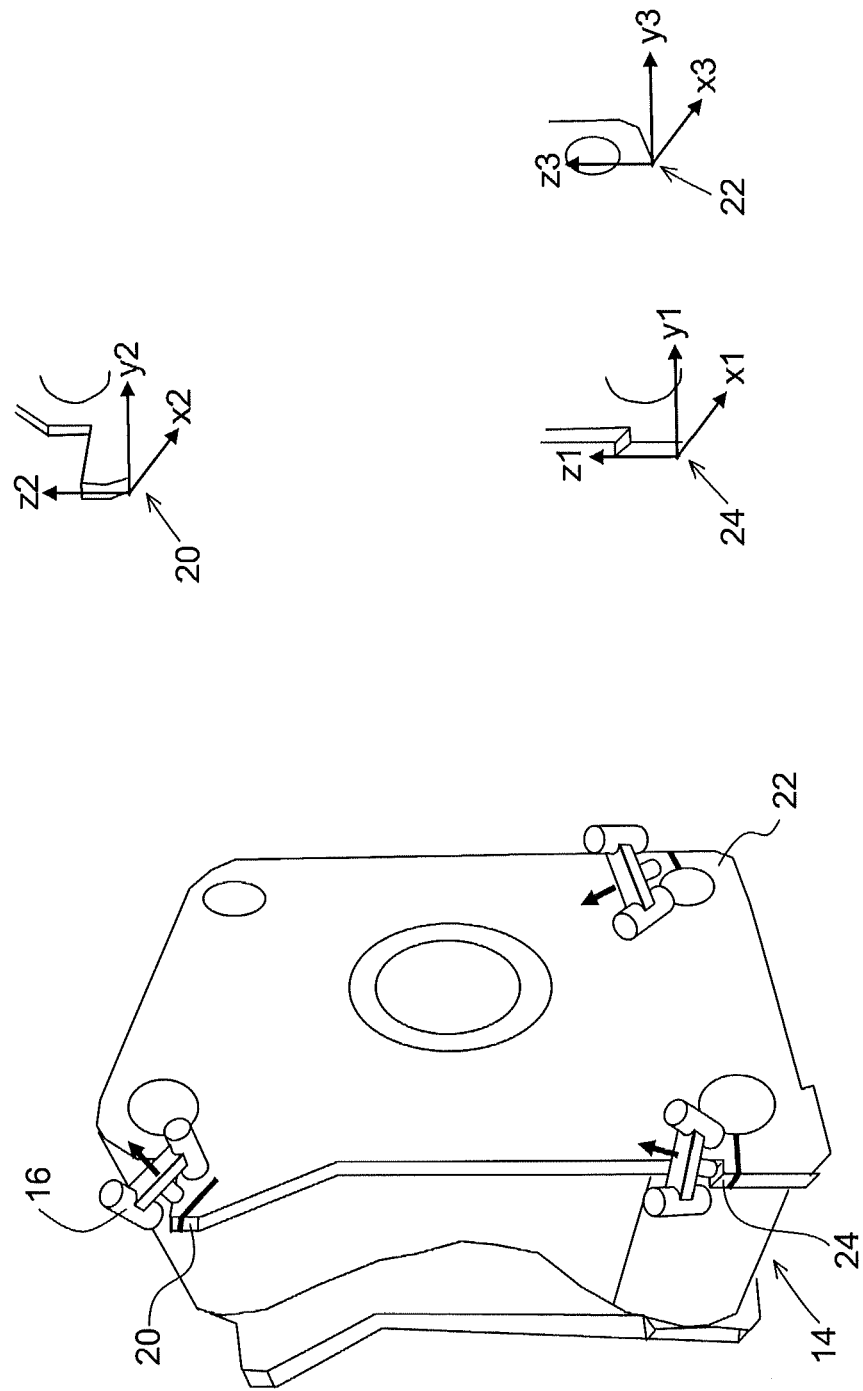
FIG. 5 shows the measurement unit measuring three small feature of the work object in the CAD system according to an exemplary embodiment of the disclosure.

In the examples illustrated in FIGS. 3 and 5, three small features 20, 22, 24 are defined on the CAD model of the work object. Those small features correspond to the small features 7, 8, 9 of the real work object. FIG. 5 shows the features in more detail and also the position and orientation of the measuring unit model 16 relative the work object model during measurement of the small features. The joints of the CAD model 10 of the robot are manipulated (by running the robot control in Cartesian mode) until the CAD model 16 of the measuring unit is moved to a second position and orientation in relation to the platform allowing accurate close measurement of the small feature of the work object, as seen from FIG. 4. This second position is closer to the work object than the first position, shown in FIG. 3, in which the large feature was measured. The second position and orientation of the measuring unit model 16 is stored. If more than one feature is used, the positioning and storing steps are repeated for all of the small features. CAD models of the small features are generated based on the CAD model of the work object as seen from the measuring unit in the second position and orientation used during measuring of the small features. The generated CAD models of the small features are stored in the CAD system.

To obtain maximum accuracy from the feature geometry, the orientation and distance of the measuring unit relative to the small feature are adjusted until the highest 6 DOF accuracy levels are obtained. In order to make this adjustment simple, a TCP (Tool Centre Point), can be defined in the middle of the measurement range of the measurement unit. During manipulation of the measurement unit, the CAD system should continuously calculate the closest measured distance and inform the user of this distance, in order to avoid collisions. Because the same measurement unit is used for the platform placement as well as the high accuracy calibration, the measurement range should be possible to change. For scanner based on triangulation this can be made by a motorized manipulation of the optical angle between the laser and the detector, and if desired, it should also be possible to control the distance between the laser and the detector.

When deciding on the number of features desired, it is suitable to have a function in the CAD system to calculate the position error at the border of the work object from the 6 DOF accuracy levels obtained by the measurement unit model.

When virtual feature measurements for a work object have been made, calibration programs are generated which instruct the real robot to be moved so that the measuring unit achieves positions and orientations, in relation to the platform, suitable for measuring the small features. The calibration program instructs the robot to move the measurement unit between the small features. The calibration programs are stored together with the CAD models of the features. In the case of a line scanner, also the scanning movement programs are stored together with the CAD models. In this exemplary embodiment of the disclosure, the calibration program will further contain movement orders to the robot itself to bring the measurement unit to the positions and orientations as determined in the CAD system for the measurement of the small features. An order to the 3D measurement system to perform measurements of the small features can be if a line scanner is used, order the scanning movements to the robot itself. Routines to make best fit between CAD models for the small features can be, if only one small feature is used, a call routine to calculate 6 DOF difference in position and orientation between the two CAD models. If two small features are used, a call routine to calculate 6 DOF differences in position and orientation for each of the two small features and then calculate the average 6 DOF difference in position and orientation for the two small features. If three small features are used, a call routine to calculate differences in position and orientation of each of the three small features and then calculate the 6 DOF difference in position and orientation for the whole work object from the 3 DOF position differences of the three small features. Also, a routine to adjust the 6 DOF coordinate system transformation between the robot coordinate system and the work object coordinate system based on the 6 DOF difference in position and orientation can be used.

Moreover, a work object coordinate system can be defined related to the CAD models of the features, for example, the robot wrist coordinate system at certain position when the robot is in one of the measurement positions. The processing program is then made in relation to the defined work object coordinate system. This program also contains the tool exchange between the measurement unit and the process tool.

The next step of the calibration method is carried out in the real world, for example, in the work shop. The CAD models of the features to be measured, the calibration programs to move the measurement unit to the features, and optionally scanning movement programs are stored in the control system 2 of the robot, or in a computer that communicates with the control system 2. If the process movements of the robot are programmed in the same CAD system as is used for the preparation of the calibration, the control system is provided with the CAD models of the features and the robot programs used for the calibration movements together with the process program.

In a next step, the placement of the real platform relative to the work object is carried out. The control system has all the information needed for performing the placement. FIG. 6 shows an example of the pose of the platform and the robot before the calibration has started. At first, the real robot is automatically moved to achieve the first position and orientation of the measuring unit relative to the robot base coordinate system as prepared in the CAD system for the measurement of the large feature, as shown in FIG. 7. This is done by running the first part of the calibration program generated in the CAD system that moves the measurement unit to the first position and orientation. Then, the real platform can be moved by the operator until the measurement unit has a suitable position and orientation relative to the large feature so that measurements of the large feature can be made, as shown in FIG. 8. Then, the operator starts a program for platform placement and the platform can automatically be controlled to obtain the position relative to the work object, as determined in the CAD system. Alternatively, the placement of the platform can be carried out first and then the measuring unit can be positioned even if it is then more difficult for the operator to find a suitable first rough placement of the platform.

The user can then start the rest of the calibration program that orders the measurements and the fine adjustment of the platform position and orientation. The calibration program could be run iteratively to refine the placement of the platform.

If the measurement unit includes a camera it is possible to show the operator the camera view with an overlap of the large feature as generated by the CAD system. When the platform has been placed, the operator starts the calibration program and the following will be performed automatically: 3D measurements of the large feature are made by the measuring unit 4, a CAD model of the large feature 6 is generated based on the 3D measurements of the large feature, a best fit including model scaling and rotation is made between the CAD generated and the measured models and the 6 DOF pose difference is calculated. For example, the distances between the CAD models can be minimized by a least mean square method during the best fit. The mobile platform 3 is instructed to move and reorient to compensate for the calculated pose difference. If the platform is only portable and not automatically controllable, the placement error is shown on a display and the operator moves the platform to reduce the error values until an acceptable error level calculated by the CAD system is obtained. During these movements, the platform placement error (x, y. angle) is continuously updated.

Figure 9:
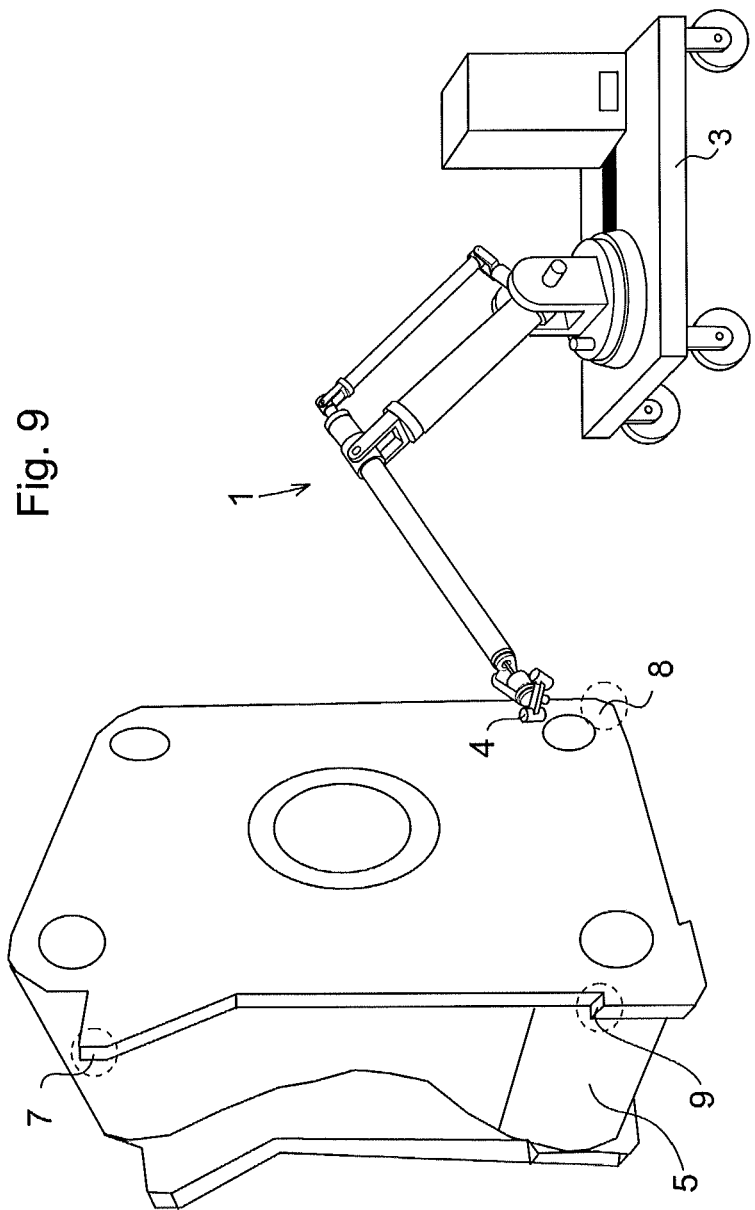
FIG. 9 shows the measurement unit measuring a small feature of the work object in the real robot cell according to an exemplary embodiment of the disclosure.

When high accuracy is desired, the following steps can be carried out to improve the accuracy of the calibration. The robot 1 is automatically manipulated to move the measuring unit 4 to the second position and orientation in relation to the platform, to allow measurement of one of the small features, as shown in FIG. 9. 3D measurements of the small feature 8 are performed by the measuring unit 4. A CAD model of the small feature 8 is generated based on the 3D measurements. In case more than one small feature is needed to achieve an accurate calibration, the above mentioned moving, measuring and generating steps are repeated for each of the small features 7,8,9. If a line scanner is used, the programmed scanning movements can be made at each measurement pose. Best fits are made between the CAD generated and the measured CAD models of the small features using a known method as, for example, Iterative Closest Point. For each feature the position and orientation of the feature coordinate system as defined during the CAD work is determined from the 3D measurements. If 3 small features are used, the origin of the 3 small feature coordinate systems can be used to make a simple 3 points determination of the position and orientation of the work object. The real work object deviation in relation to the work object defined in the CAD system is calculated as a 6 DOF pose difference between the CAD generated and measured CAD models. This difference is then used for adjusting the 6 DOF coordinate system transformation between the robot coordinate system and the work object coordinate system.

Figure 10:
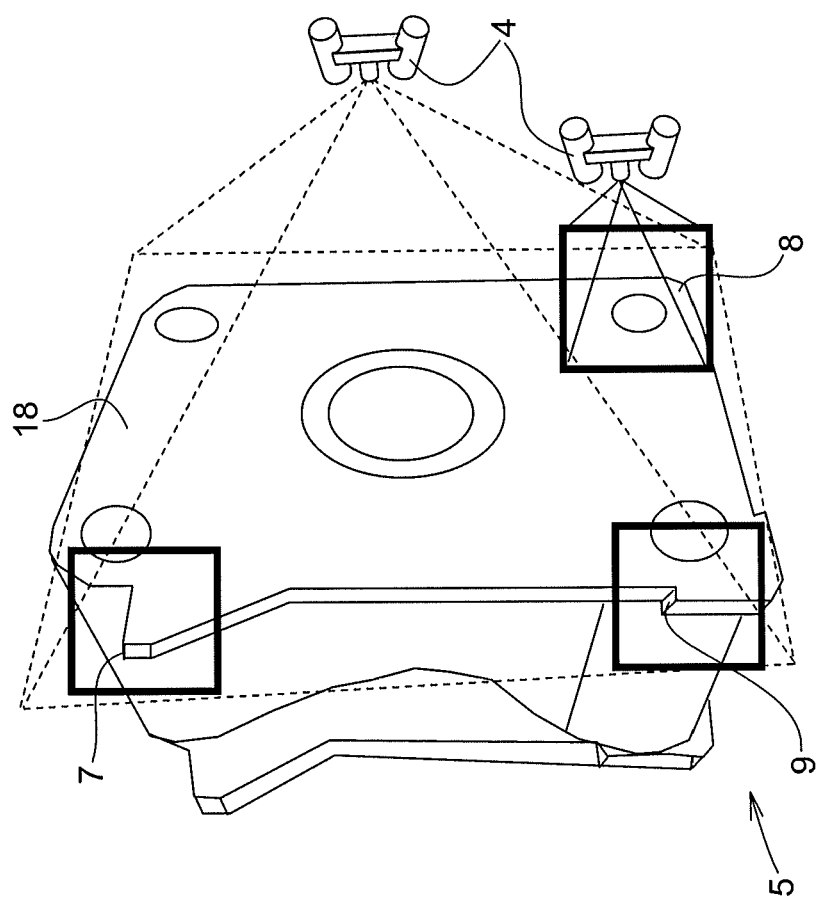
FIG. 10 shows the position of the measuring unit when measuring a large feature and a small feature according to an exemplary embodiment of the disclosure.

FIG. 10 shows the position of the measuring unit when it is measuring the large feature 18 and when it measures one of the small features 8. As seen from the figure, the measuring unit 4 is closer to the work object 5 when it measures the small feature compared to when it measures the large feature 18. Note that the platform is not moved between the last measurement of the large feature and the measurement of the small feature, only the position of the measuring unit is changed by movements of the robot joints, as seen from FIGS. 8 and 9.

Figure 11:
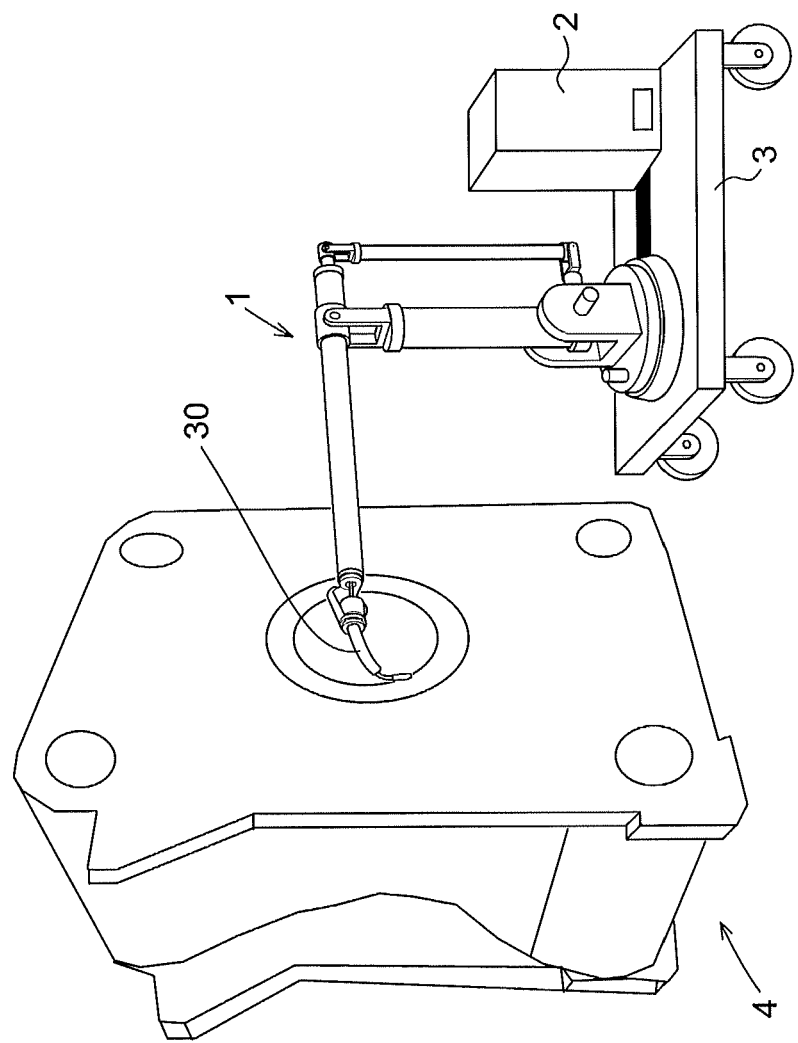
FIG. 11 shows the robot holding a tool during programming of the robot according to an exemplary embodiment of the disclosure.

When the work object coordinate system has been adjusted, the system informs the operator that the process program can start. The measuring unit 4 is exchanged to a processing tool 30, as shown in FIG. 11. The operator starts the process program. The process program is executed and if necessary the user makes program adjustments. If desired, touchup can be made of the process program. This will not mean a need of a new calibration. It should be mentioned that if local coordinate systems have been used when programming parts of the work object, these should be defined in relation to the automatically generated work object coordinate system. Using an ABB system, the user coordinate system should be used as a work object coordinate system and the ABB object coordinate system should be used as a local coordinate system.

There are some cases when there are no CAD models of the work objects to be processed and calibration and programming can be made manually. This means that the use of the mobile robot can rely on the skills of its operators and the robot system should help the operator as much as possible to understand the results from the calibration process using the 3D measurement unit. In the following it is described how calibration and programming is made in this case.

Step 1: The robot 1 on the platform is moved to a first processing area of the work object 5.

An issue here for the user is to find a suitable placement of the mobile (or portable) platform. It will be desirable to jog the robot to check that it reaches the intended area of the work object. If not, the platform position and orientation can be adjusted. It should also be noted that the platform could have a lift to make it possible for the robot to reach a high work object. Sometimes it might be difficult for the user to see that the robot really reaches the whole area to be processed and it could be advantageous to include a camera in the measurement unit making it possible for the user to see what the tool can reach.

Step 2: When a suitable placement of the platform 2 has been reached, the operator starts a program which picks the measurement unit from the tool exchanger. He moves the measurement unit 3 to obtain a 3D measurement of a relative large area of the work object corresponding to the large feature, compare FIG. 6.

The result of the 3D measurements of the large feature is transformed to a geometric 3D model, in the following named a CAD model, for example, using polygons, and saved for use when upcoming objects will be processed. For upcoming work objects this CAD model will be scaled and moved/rotated until it matches the CAD model measured when the platform is placed relative to the other identical object. The 6 DOF CAD model difference can then be used to calculate a corrective movement of the platform.

Step 3: In order to obtain an accurate 6 DOF calibration of the work object in relation to the robot, the operator jogs the robot such that the measurement unit gets close to at least one well defined 3D feature on the work object. Compare to FIG. 5. Also here the user could benefit from a camera in the measurement unit to see the measurement area. The orientation of the measurement unit is such that the perspective is useful. Of exemplary importance is that when a line scanner is used, the robot should move the measurement unit during the scanning of the feature. In order to facilitate the jogging of the robot to a feature the following functionality can be implemented: a) TCP is defined at the center of the measurement area, making it easy for the user to reorient the measurement unit; b) During manipulation the system continuously calculates the closest measured distance and stops the robot if this distance is smaller than a configured value; c) Scanning area shown as an overlay on the displayed camera view; d) The system informs the user on the measurement accuracy that is obtained for the selected feature at the present distance. When a line scanner is used more functionality could be desirable as: e) automatically selected robot scanning movement (right angle to the measurement direction) is shown as an overlay on the camera view; f) During the robot scanning movement the distance measured between the measurement unit and the feature is used to control the robot in such a way that collisions are avoided.

The 3D-model from the feature scanning is stored and the accuracy with respect to position and orientation is displayed for the user. In order to know if measurements on more features are desirable, the user also gets figures on the accuracy at different distances from the feature (using the accuracy values of the measured orientation). Knowing the size of the object, the user can decide if measurements of more features are desired. The system can also make accuracy calculations for the measurements made according to step 2 when the placement of the platform is calculated. If this calculation shows that the platform placement error is larger than the measured feature, the operator is urged to make a more accurate platform placement measurement or use a larger feature. The 3D geometrical model for each feature is stored as well as the program made by the user to move to the features. In the case of a line scanner also the scanning movement is stored.

When a large plane work object is calibrated, overlapping calibration can be made, meaning that at least one calibration feature is used in two adjacent processing areas. It is then possible to reduce the specifications on the calibration because the information that the features are in a common plane can be used. The knowledge of the gross shape of a large object can also be used for automatic movement of the mobile platform. For example, after the measurements of three features and the calculation of the work object plane, the platform can move parallel to the plane while the robot locks the measurement unit to the overlapping feature. The platform stops its movement when the robot arm reaches its work space limit.

Step 4: The operator programs the robot.

The programming is made in a work object coordinate system defined by the feature measurements. For example, the work object coordinate system could just be the wrist coordinate system for one position when a feature measurement was made. Exemplary importance for upcoming work objects is that the relation between the defined work object coordinate system and the geometrical models of the measured features are exactly known. This also means that it is desirable that the tool exchange is as accurate as specified by the process.

The exemplary embodiments of the present disclosure can also be implemented by at least one processor (e.g., general purpose or application specific) of a computer processing device which is configured to execute a computer program tangibly recorded on a non-transitory computer-readable recording medium, such as a hard disk drive, flash memory, optical memory or any other type of non-volatile memory. Upon executing the program, the at least one processor is configured to perform the operative functions of the above-described exemplary embodiments.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for determining the placement of a real robot including a plurality of joints and positioned on a movable real platform, in relation to a real work object, using a real measuring unit mounted on a wrist of the real robot, the method including first steps performed by a processor coupled to a memory including a software CAD system, which first steps comprise:

loading CAD models of the real robot, the real movable platform, the real measuring unit on the real robot, and the real work object into the CAD system;

placing the CAD platform and the CAD work object in a relation to each other so that the CAD robot is able to reach the CAD work object;

manipulating the joints of the CAD robot until the CAD measuring unit is moved to a first position and orientation in relation to the CAD platform allowing measurement of a CAD first feature of the CAD work object;

storing the first position and orientation of the CAD measuring unit;

generating a first CAD model of the CAD first feature based on the CAD work object as seen from the CAD measuring unit in the first position and orientation and;

storing the first CAD model of the CAD first feature in the CAD system;

and the processor performing second steps on the real robot:

automatically moving the real robot to achieve the first position and orientation of the real measuring unit in relation to the real platform;

moving the real platform to a place where measurements of the real first feature can be made;

performing 3D measurements of the real first feature by the real measuring unit;

generating a second CAD model of the real first feature based on the 3D measurements of the real first feature;

performing a best fit, including scaling and rotation, between the first and the second CAD models of the first feature, and calculating a 6 degrees of freedom (DOF) pose difference between the first and second CAD models based on a result of the best fit; and adjusting a position and orientation of the real platform by instructing the real platform to move and reorient to compensate for the calculated pose difference.

* * * * *